(12) United States Patent
Nanda

(10) Patent No.: US 7,103,716 B1
(45) Date of Patent: *Sep. 5, 2006

(54) RAID 6 DISK ARRAY WITH PRIME NUMBER MINUS ONE DISKS

(75) Inventor: Sanjeeb Nanda, Winter Springs, FL (US)

(73) Assignee: Adaptec, Inc., Milpitas, CA (US)

( * ) Notice: Subject to any disclaimer, the term of this patent is extended or adjusted under 35 U.S.C. 154(b) by 343 days.

This patent is subject to a terminal disclaimer.

(21) Appl. No.: 10/607,381

(22) Filed: Jun. 26, 2003

(51) Int. Cl.
*G06F 12/16* (2006.01)

(52) U.S. Cl. .......................... 711/114; 714/6

(58) Field of Classification Search ............ 714/5, 714/6, 100, 699, 700, 770; 711/100, 114
See application file for complete search history.

(56) References Cited

U.S. PATENT DOCUMENTS

| | | | | |
|---|---|---|---|---|
| 5,499,253 A * | 3/1996 | Lary | ........................... | 714/770 |
| 5,790,774 A | 8/1998 | Sarkozy | | |
| 5,805,788 A | 9/1998 | Johnson | | |
| 5,862,158 A * | 1/1999 | Baylor et al. | ............... | 714/800 |
| 6,000,010 A | 12/1999 | Legg | | |
| 6,101,615 A * | 8/2000 | Lyons | ........................... | 714/6 |
| 6,138,125 A * | 10/2000 | DeMoss | ..................... | 707/202 |
| 6,148,430 A | 11/2000 | Weng | | |
| 6,158,017 A * | 12/2000 | Han et al. | ....................... | 714/6 |
| 6,327,672 B1 * | 12/2001 | Wilner | .......................... | 714/6 |
| 6,353,895 B1 * | 3/2002 | Stephenson | ..................... | 714/5 |
| 6,453,428 B1 * | 9/2002 | Stephenson | ..................... | 714/6 |
| 6,484,269 B1 * | 11/2002 | Kopylovitz | .................... | 714/5 |
| 6,807,605 B1 * | 10/2004 | Umberger et al. | .......... | 711/114 |
| 6,851,082 B1 * | 2/2005 | Corbett | ....................... | 714/770 |
| 2002/0095616 A1 * | 7/2002 | Busser | ......................... | 714/8 |
| 2003/0084397 A1 * | 5/2003 | Peleg | ......................... | 714/770 |
| 2003/0163757 A1 * | 8/2003 | Kang et al. | ..................... | 714/6 |
| 2003/0167439 A1 * | 9/2003 | Talagala et al. | ............ | 714/770 |
| 2003/0233611 A1 * | 12/2003 | Humlicek et al. | .......... | 714/763 |
| 2004/0250161 A1 * | 12/2004 | Patterson | ........................ | 714/6 |

* cited by examiner

*Primary Examiner*—Reginald G. Bragdon
*Assistant Examiner*—Thanh D Vo
(74) *Attorney, Agent, or Firm*—W. David Sartor; Beusse Wolter Sanks Mora & Maire, P.A.

(57) ABSTRACT

A RAID 6 architecture including a disk array having a prime number minus 1 disks. A method of providing multiple disk fault tolerance in an N–column×R–row logical representation of a set of data elements, wherein N represents the number of disks in the array and R is equivalent to N/2, includes assigning each strip containing data to at least two different parity groups so that each strip containing data in a respective column is assigned to parity groups different than other strips containing data in the column. The method also includes calculating, for each parity group, a parity value corresponding to all of the strips assigned to the parity group. The method further includes storing each of the parity values in strips of different columns, so that none of the strips containing data in a column are assigned to a parity group for which the parity value for the parity group is stored in the column.

11 Claims, 4 Drawing Sheets

| | 1 | 2 | 3 | ... | N-1 | N |
|---|---|---|---|---|---|---|
| 1 | $\{GA_{1,1}, GB_{1,1}\}$ | $\{GA_{1,2}, GB_{1,2}\}$ | $\{GA_{1,3}, GB_{1,3}\}$ | ... | $\{GA_{1,N-1}, GB_{1,N-1}\}$ | $\{GA_{1,N}, GB_{1,N}\}$ |
| 2 | $\{GA_{2,1}, GB_{2,1}\}$ | $\{GA_{2,2}, GB_{2,2}\}$ | $\{GA_{2,3}, GB_{2,3}\}$ | ... | $\{GA_{2,N-1}, GB_{2,N-1}\}$ | $\{GA_{2,N}, GB_{2,N}\}$ |
| 3 | $\{GA_{3,1}, GB_{3,1}\}$ | $\{GA_{3,2}, GB_{3,2}\}$ | $\{GA_{3,3}, GB_{3,3}\}$ | ... | $\{GA_{3,N-1}, GB_{3,N-1}\}$ | $\{GA_{3,N}, GB_{3,N}\}$ |
| ... | ... | ... | ... | | ... | ... |
| R-1 | $\{GA_{R-1,1}, GB_{R-1,1}\}$ | $\{GA_{R-1,2}, GB_{R-1,2}\}$ | $\{GA_{R-1,3}, GB_{R-1,3}\}$ | ... | $\{GA_{R-1,N-1}, GB_{R-1,N-1}\}$ | $\{GA_{R-1,N}, GB_{R-1,N}\}$ |
| R | $\{P_1\}$ | $\{P_2\}$ | $\{P_3\}$ | ... | $\{P_{N-1}\}$ | $\{P_N\}$ |

Columns / Rows

Fig. 2

|   | 1 | 2 | 3 | 4 | 5 | 6 |
|---|---|---|---|---|---|---|
| 1 | {1,4} | {2,1} | {3,5} | {4,2} | {5,6} | {6,3} |
| 2 | {2,3} | {4,6} | {6,2} | {1,5} | {3,1} | {5,4} |
| 3 | {5} | {3} | {1} | {6} | {4} | {2} |

Rows / Columns

Fig. 4

RAID 6 DISK ARRAY WITH PRIME NUMBER MINUS ONE DISKS

BACKGROUND OF THE INVENTION

1. Field of the Invention

The present invention is generally related to disk array architectures, and, specifically, to a RAID 6, two disk fault tolerant architecture.

2. Related Art

It is known to store data in an array of disks managed by an array controller to control the storage and retrieval of data from the array. One example of such a system is a Redundant Array of Independent Disks (RAID) comprising a collection of multiple disks organized into a disk array managed by a common array controller. The array controller presents the array to the user as one or more virtual disks. Disk arrays are the framework to which RAID functionality is added in functional levels to produce cost-effective, high-performance disk systems having varying degrees of reliability based on the type of RAID architecture implemented. RAID architecture can be conceptualized in two dimensions as individual disks arranged in adjacent columns. Typically, each disk is partitioned with several identically sized data partitions known as strips, or minor stripes. Distributed across the array of disks in rows, the identically sized partitioned strips form a data stripe across the entire array of disks. Therefore, the array contains stripes of data distributed as rows in the array, wherein each disk is partitioned into strips of identically partitioned data and only one strip of data is associated with each stripe in the array.

As is known, RAID architectures have been standardized into several categories. RAID level 0 is a performance-oriented striped data mapping technique incorporating uniformly sized blocks of storage assigned in a regular sequence to all of the disks in the array. RAID level 1, also called mirroring, provides simplicity and a high level of data availability, but at a relatively high cost due to the redundancy of the disks. RAID level 3 adds redundant information in the form of parity data to a parallel accessed striped array, permitting regeneration and rebuilding of lost data in the event of a single-disk failure. RAID level 4 uses parity concentrated on a single disk to allow error correction in the event of a single disk failure, but the member disks in a RAID 4 array are independently accessible. In a RAID 5 implementation, parity data is distributed across some or all of the member disks in the array. Thus, the RAID 5 architecture achieves performance by striping data blocks among N disks, and achieves fault-tolerance by using 1/N of its storage for parity blocks, calculated by taking the exclusive-or (XOR) of all data blocks in the parity disks row. A RAID 6 architecture is similar to RAID 5, but RAID 6 can overcome the failure of any two disks by using an additional parity block for each row (for a storage loss of 2/N). The first parity block (P) is calculated with XOR of the data blocks. The second parity block (Q) employs Reed-Solomon codes. One drawback of the known RAID 6 implementation is that it requires a complex and computationally time-consuming array controller to implement the Reed-Solomon codes necessary to recover from a two-disk failure. The complexity of Reed-Solomon codes may preclude the use of such codes in software, and may necessitate the use of expensive special purpose hardware. Thus, implementation of Reed-Solomon codes in a disk array increases the cost, complexity, and processing time of the array.

In addition, other schemes have been proposed to implement a two-disk fault protection, but the reconstruction sequences used in such schemes may be dependent on prior strips being recreated before a predetermined strip can be reconstructed. For example, in an N-row by N-column array, an average dependency length, or number of strips required to be reconstructed before a desired strip can be reconstructed, is approximately equal to N.

SUMMARY OF THE INVENTION

An method of providing multiple disk fault tolerance in an N-column by R-row logical representation of a set of data elements in an array of independent disks is disclosed herein, N being equal to one less than a prime number P, and R being equal to half of one less than P. The data in the set is organized into a plurality of stripes, each stripe comprising a plurality of strips, and all strips of a column are located on the same disk. One and only one parity value is stored per column per set. The method includes assigning each strip containing data to at least two different parity groups so that each strip containing data in a respective column is assigned to parity groups different than other strips containing data in the same column. The method further includes calculating, for each parity group, a parity value corresponding to all of the strips assigned to the parity group and storing each of the parity values in strips of different columns so that none of the strips containing data in a column are assigned to a parity group whose parity value is stored in that column. Data stored in the array may be recovered by using intact members of the respective parity group and the stored parity of the respective parity group.

DESCRIPTION OF THE DRAWINGS

The present invention will become apparent from the following detailed description of the invention when read with the accompanying drawings in which:

FIG. 2 illustrates an exemplary logical representation of a disk array storage format.

FIG. 4 illustrates an exemplary array configured for providing multiple disk failure fault tolerance.

Figure 1:
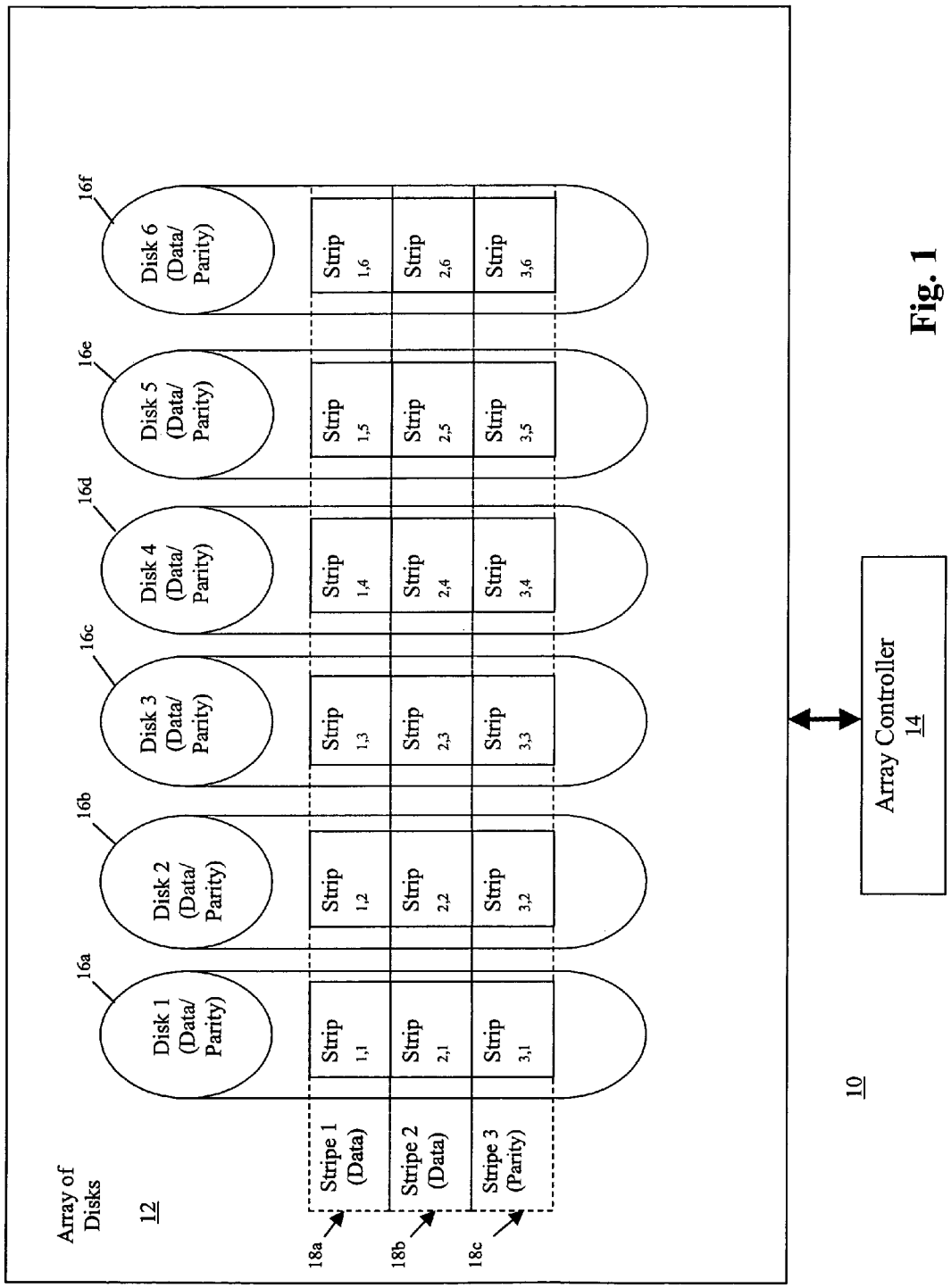
FIG. 1 illustrates an exemplary block diagram representation of a fault tolerant data storage system.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

FIG. 1 illustrates a data storage system 10 including an array of disks 12 for storing data and an array controller 14 for controlling the storage and retrieval of data in the array 12. In one aspect of the invention, the system 10 may be configured as a RAID 6 type architecture, as understood by a skilled artisan. The array controller 14, coupled to array of disks 12, allocates logical units, or strips, into logical rows, or stripes, extending across the physical disks in the array 12. Each disk in the array 12 may be consecutively indexed, each stripe in the array 12 may be consecutively indexed, and each strip may be indexed according to the corresponding disk and stripe membership. For example, the array 12 depicted in FIG. 1 includes six disks, disks 1–6 (16a–16f), allocated with three stripes, stripes 1–3 (18a–18c), so that each disk includes three strips indexed by both disk and stripe membership, and each stripe includes six strips allocated across the disks. Although FIG. 1, for the sake of simplicity of illustration, illustrates a six disk array 12 configured to include three stripes (18a–18c), it will be understood that the present invention is not limited to a specific number of physical disks or a specific number of stripes, provided the number of disks in the array is a prime number minus one or the number of disks in the array is divided into sets of disks, each set of disks having a prime number minus one disks. The data storage and recovery technique described herein may be implemented in reconstruction set sections contiguously configured throughout a RAID array, provided each of the reconstruction sets complies with the format as described herein.

In an embodiment, the array 12 of disks can be mapped by the array controller 14 into one or more N–column by R–Row logical representations of data elements. For each section of the array mapped into an N–column by R–Row logical representation, a stripe is reserved for storing array reconstruction information. For example, the highest indexed stripe (18c), or parity stripe, can be reserved for storing parity values corresponding to parity groups defined in the section. The remaining stripes in the array section (18a and 18b), can then be used to store data.

FIG. 2 illustrates an exemplary logical representation of a set of data elements in a disk array storage format. In an aspect of the invention, the disk array is partitioned into a plurality of logically represented N–column by R–row sets, N being one less than a prime number, P, and R being equal to half of one less than P, so that the columns correspond to the disks in the array and the rows extend across all the disks in the array. This configuration may be repeated as reconstruction sets throughout the entire array. For example, an N by 2 R disk array may be configured to a have two contiguous N by R reconstruction sets.

Generally, the data in each set in the disk array is organized into a plurality of stripes, each stripe comprising a plurality of strips, and one and only one parity value stored per column, per set. Each set is configured by assigning each strip containing data to at least two different parity groups, so that each strip containing data in a respective column is assigned to parity groups different than other strips containing data in the column. Accordingly, a member of a parity group will appear only once in a column, and all other members of the group, including the parity value, will appear in respective different columns. In an array of N disks, each parity group of each set has N–2 data strips and one parity strip as its members.

Parity values corresponding to all of the strips assigned to the parity group are then calculated for each parity group. For example, the parity values for each parity group may be calculated by computing the exclusive-or (XOR) of the information in each data strip assigned to the respective parity group. Each of the parity values are then stored in strips of different columns, so that none of the strips containing data in a column are assigned to a parity group whose parity value is stored in that column. In one form, a row of each reconstruction set, such as the last row of the set, may be reserved for storing the parity values.

As shown in FIG. 2, data may be stored in columns 1 to N and in rows 1 to (R–1). Row R is reserved for parity values. Each data strip in the array belongs to two different parity groups and is used for the calculation of the parities corresponding to those two groups. Thus, parity group membership for each data strip can be indicated by a 2-tuple, the first value in the tuple representing membership in a first parity group, the second value in the tuple indicating membership in a second parity group. For example, in the representative 2-tuple $\{GA_{r,c}, GB_{r,c}\}$, the first coordinate $GA_{r,c}$ represents the ordinal value of the first parity group to which the current data strip belongs, with the subscript r indicates the current row location, and the subscript c represents the current column location of the data strip. The second coordinate, $GB_{r,c}$, represents the ordinal value of the second parity group to which the current data strip belongs. In an aspect of the invention, membership of the current data element in a first parity group $GA_{r,c}$, whose value is calculated using the formula (1):

$$GA_{r,c} = (r \times c) \bmod P; \quad (1)$$

where P is equal to N (the number of disks in the array)+1, and "x" indicates the multiplication function.

Membership in a second parity group $GB_{r,c}$, whose value is calculated using the formula (2):

$$GB_{r,c} = [(N-1-r) \times c] \bmod P. \quad (2)$$

Parity value for each parity group is assigned to the parity strip denoted by the same ordinal value $p_c$ (as the parity group) and calculated using the formula (3):

$$p_c = [(N-1) \times c] \bmod P; \quad (3)$$

where c is the current column location of the strip for storing the assigned parity value.

Formulas (1), (2), and (3) ensure that no parity group member (including data strip members and the parity value for the group) appears more than once in a column of a set. Conversely, a parity group member stored in a column belongs to a parity group different from all other members stored in the column of the set.

The inventor has experimentally demonstrated that the formulas described above prevent the occurrence of any cyclic path of parity group pairs. A path of parity group pairs is a sequence of 2-tuples of the form $\{GA_{r,c}, GB_{r,c}\}$ where each 2-tuple except the first and last one in the sequence, shares a common coordinate (i.e., a parity group) with the previous and another common coordinate with the succeeding 2-tuple in the sequence. The first 2-tuple in the sequence shares a common coordinate with only the succeeding 2-tuple in the sequence, and the last 2-tuple in the sequence shares a common coordinate with only the previous 2-tuple in the sequence. A cyclic path of parity group pairs is then a path of parity group pairs where each and every 2-tuple in the sequence shares a common coordinate (i.e., a parity group) with the previous and another common coordinate with the succeeding 2-tuple in the sequence. Furthermore the inventor has experimentally demonstrated that each and every strip on a pair of failed disks belongs to a non-cyclic path of parity group pairs. These aforementioned properties allow reconstruction of the set in the case of two simultaneously failed disks in the array.

If two disks in an array fail, for example, simultaneously or a second disk fails while a first disk is being reconstructed, the contents of a data strip on a failed disk can be reconstructed if the remaining member strips of at least one of the parity groups to which the data strip belongs is intact. Accordingly, to reconstruct a strip on either of the failed disks, a data strip on either of the failed disks must be identified so that none of the remaining members of one of the parity groups to which the identified data strips belongs appears on either of the failed disks.

Figure 3:
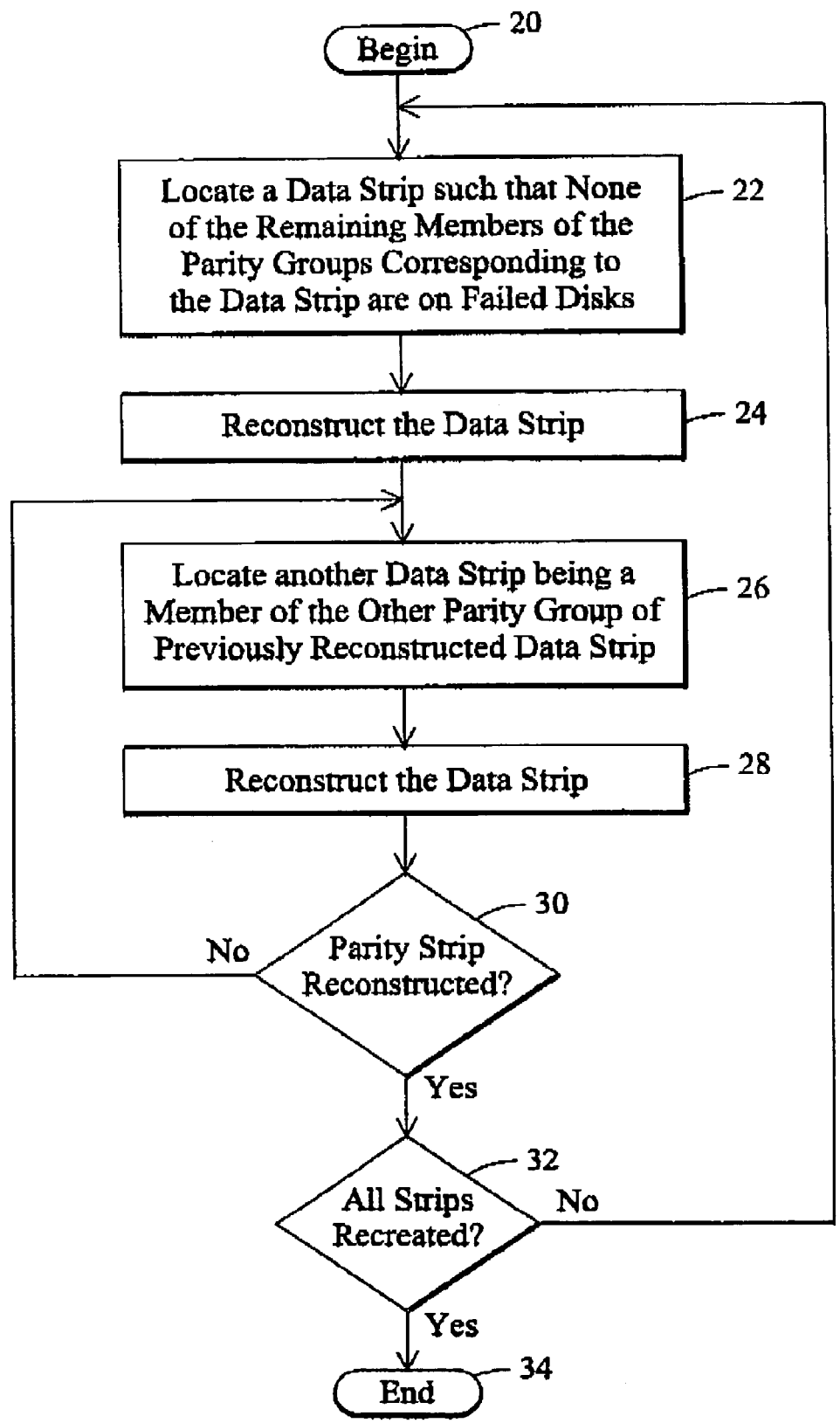
FIG. 3 is an exemplary flow chart illustrating a method of providing disk fault tolerance in an array of disks.

FIG. 3 is a flow chart illustrating a method of providing disk fault tolerance in an array of disks. For example, if two arbitrary disks, $d_i$ and $d_j$, where $1 \leq i, j \leq N$, fail, the contents of a strip $(r, c)_1$ located on row r and column c of the failed disk can be reconstructed if the remaining member strips of at least one of the parity groups $G_1$ or $G_2$ to which the strip belongs are intact. As shown in FIG. 3, the reconstruction procedure begins 20 by locating a data strip $(r, c)_1$ on either $d_i$ or $d_j$ such that none of the remaining members of one of the parity groups $G_1$ or $G_2$ (of which the strip $(r, c)_1$ is a member) appear in either failed disk $d_i$ or $d_j$ 22. Without loss of generality, assuming the data strip $(r, c)_1$ occurs on the damaged disk $d_i$, and none of the other members of the parity group $G_1$ appear on disks $d_i$ or $d_j$, the data strip $(r, c)_1$ can be reconstructed 24 using the surviving member strips (including the parity strip) of the parity group $G_1$. After the data strip $(r, c)_1$ is reconstructed, a second data strip $(r, c)_2$ is located, for example, on disk $d_j$, that is a member of the parity group $G_2$ and $G_3$ 26. The second data strip $(r, c)_2$, belonging to the parity group $G_2$, can be reconstructed 28 because the first strip $(r, c)_1$ that has been already reconstructed is also a member of parity group $G_2$, and there can be at most two strips of any parity group on disks $d_i$ and $d_j$. Next, we locate a third data strip $(r, c)_3$ on disk $d_i$ that is a member of the parity group $G_2$ and $G_3$ The third data strip $(r, c)_3$, belonging to the parity group $G_3$, can be reconstructed because the second strip $(r, c)_2$ that has been already reconstructed is also a member of parity group $G_3$, and there can be at most two strips of any parity group on disks $d_i$ and $d_j$.

Data strips can be sequentially reconstructed in this manner by reconstructing a data strip and then identifying another failed strip that is a member of at least one of the parity groups that the previously reconstructed strip is a member. Strips are reconstructed until there are no further strips to be reconstructed in either $d_i$ or $d_j$, or the next strip that can be reconstructed in the sequence is a strip containing a parity value 30. Once the parity strip is reconstructed, the reconstruction sequence is terminated because the parity strip is a member of exactly one unique parity group. If however, there are strips remaining in $d_i$ and $d_j$ that are yet to be reconstructed 32, another reconstruction sequence is started by locating some data strip $(r, c)_k$ on either $d_i$ or $d_j$ such that none of the other members of one of the parity groups $G_k$ or $G_{k+1}$ (of which the strip $(r, c)_k$ is a member), appear in either $d_i$ or $d_j$, 22, and proceed in the manner described previously. While this describes the procedure for reconstructing data for one set of a set in a disk array, it should be understood that an array may be partitioned into many sets, and the previously described technique would be performed on each of the component sets of the array to completely recover from the loss of two failed disks.

FIG. 4 illustrates an exemplary array logically configured for providing multiple disk failure fault tolerance. As shown, the array includes three rows and six columns. Each row represents a stripe, and each column represents a disk in the array. For simplicity, only one reconstruction set is illustrated as comprising the array. The reconstruction set contains twelve data strips in the top two stripes and six parity strips in the bottom-most stripe of the array. Each data strip belongs to two parity groups and is used for the calculation of the parity corresponding to those two groups as described previously. For example, data strip (1,1) (the data strip located at array position row 1, column 1) having parity membership indicated by {1,4}, belongs to parity groups $G_1$ and $G_4$. Membership in a first parity group for the data strip (1,1) is calculated according to formula (1) as (1×1) mod 7=1, and membership in a second parity group is calculated according to formula (2) as [(6−1−1)×1] mod 7=4.

The corresponding parity values for the parity groups $G_1$ and $G_4$ are stored in strips (3,3) and (3,5) respectively, since the ordinal value of the parity group whose parity is stored at strip (3,3) is calculated according to formula (3) as [(6−1)×3] mod 7=1, and the ordinal value of the parity group whose parity is stored at strip (3,5) is calculated as [(6−1)×5] mod 7=4. Each parity strip contains a parity value that is derived by taking the XOR of four data strips that belong to its corresponding parity group. For example, the parity value stored in the parity strip (3,1) for parity group $G_5$ (represented in FIG. 4 as {5}) is calculated by taking the XOR of the data strip (1,3), assigned to parity groups {3,5}; the data strip (2,4), assigned to parity groups {1,5}; the data strip (1,5), assigned to parity groups {5,6}; and the data strip (2,6), assigned to parity groups {5,4}.

Data can be recovered in the array from the failure of any two disks as follows. Assuming, without loss of generality that disk 2 and disk 5, corresponding to columns 2 and 5, have failed. The strips comprising disk 2 and disk 5 can then be reconstructed by sequentially reconstructing the strips constituting the failed disks. If a data strip (r, c) is destroyed, its contents can be reconstructed if the remaining data strips and parity strip of at least one of the parity groups to which strip (r, c) belongs are intact. Accordingly, to start reconstructing a strip on either failed disk, a data strip must be located on either disk 2 or disk 5 that belongs to a parity group that does not have any other member of the parity group located on either destroyed disk.

For example, data strip (1,2) located on disk 2 and assigned to parity groups {2,1} can be used as a starting strip. Data strip (1,2) qualifies for this purpose because it belongs to the parity group $G_2$ and no other members of $G_2$ [which includes strip (2,1), assigned to parity groups {2,3}; strip (2,3), assigned to parity groups {6,2}; strip (1,4) assigned to parity groups {4,2}; and strip (3,6) assigned the parity value for the parity group $G_2$, represented as {2}] occur on either disk 2 or disk 5. These remaining members of $G_2$ must all be intact, and thus, we can reconstruct strip (1,2) using these remaining members of $G_2$. Once strip (1,2) has been reconstructed, any data strip belonging to the parity group $G_1$ can be reconstructed because strip (1,2), assigned to parity groups {2,1}, is also a member of parity group $G_1$. Since strip (1,2) has been already reconstructed and there can be at most two strips of any parity group assigned to two disks, at most one strip belonging to the parity group $G_1$ remains to be reconstructed.

Next, data strip (2,5), assigned to groups {3,1} on disk 5, can be reconstructed because it is a member of the parity group $G_1$. Once strip (2,5) is reconstructed, any data strip belonging to the parity group $G_3$ can be reconstructed because strip (2,5) is also a member of parity group $G_3$, and there can be at most two strips of any parity group in two disks. Therefore, the strip (3,2) assigned the parity value for group $G_3$ (represented as {3}) can be reconstructed. In a similar manner, the remaining strips on disks 2 and 5 can be reconstructed in the sequence of strips (1,5) assigned parity groups {5,6}; strip (2,2) assigned parity groups {4,6}; and strip (3,5) assigned the parity value for group $G_4$ (represented as {4}); thereby completing the reconstruction of the disks 2 and 5. Accordingly, the improved RAID 6 architecture described above can reduce the dependency length required to reconstruct a desired data strip, for example on a degraded disk, is approximately equal to N/2.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. In an N–column by R–row logical representation of a set of data elements in an array of independent disks, N being equal to one less than a prime number P, and R being equal to half of one less than P, the data in the set organized into a plurality of stripes, each stripe comprising a plurality of strips, all strips of a column located on the same disk, and one and only one parity value stored per column per a reconstruction set, a method of providing multiple disk fault tolerance comprising:

assigning each strip containing data to at least two different parity groups so that each strip containing data in a respective column is assigned to parity groups different than other strips containing data in the same column, wherein assigning each strip containing data to at least two different parity groups comprises assigning membership in a first parity group, $GA_{r,c}$, whose value is calculated according to the formula:

$GA_{r,c} = (r \times c) \mod P;$ where r indicates the current row location of the strip containing data, c represents the current column location of the strip containing data, x represents the multiplication function, and P is equal to the number of disks in the array +1; and assigning membership in a second parity group $GB_{r,c}$, whose value is calculated according to the formula:

$GB_{r,c} = [(N-1r) \times c] \mod P;$ where r indicates the current row location of the strip containing data, c represents the current column location of the strip containing data; N represents the number of disks in the array, x represents the multiplication function; and P is equal to N+1;

calculating, for each parity group, a parity value corresponding to all of the strips assigned to the parity group; and storing each of the parity values in strips of different columns so that none of the strips containing data in a column are assigned to a parity group whose parity value is stored in that column.

2. The method of claim 1, further comprising defining a plurality of respective N–column by R–row logical representations of data elements in an array of independent disks.

3. The method of claim 1, further comprising reserving a parity row for storing the parity values.

4. The method of claim 3, wherein storing each of the parity values further comprises storing parity values in the reserved parity row.

5. The method of claim 1, wherein calculating the parity values for each parity group comprises computing the exclusive-or (XOR) of the information in each data strip assigned to the respective parity group.

6. The method of claim 1, wherein N–2 data strips are assigned to each parity group.

7. The method of claim 1, wherein storing each of the parity values comprises assigning each of the parity values for a respective group to a strip, $p_c$, in a column using the formula:

$p_c = [(N-1) \times c] \mod P;$ where c is the current column location of the strip for storing the assigned parity value, x represents the multiplication function, and P is equal to number of disks in the array +1.

8. The method of claim 1, further comprising, in the case of a simultaneous two disk failure, recovering data from the failed disks comprising the steps of:

a. locating a first data strip on one of the failed disks being assigned to a parity group having a parity value located on an intact disk so that none of the remaining members of at least one of the parity groups of which the data strip is a member are located on a failed disk;

b. reconstructing the first data strip using the other members of the parity group and the parity for the group;

c. locating a next data strip on one of the failed disks, the next data strip being a member of the other parity group of which the previously reconstructed data strip is a member;

d. reconstructing the next data strip using the other members of the parity group and the parity for the group;

e. alternately locating and reconstructing the remaining strips according to steps c–d until no further data strips can be recreated or a parity strip on a failed disk is reconstructed; and f. alternately locating and reconstructing the remaining strips according to steps a–e if un-recreated data strips remain after reconstructing the parity strip.

9. A system for providing multiple disk fault tolerance in an array of independent disks, comprising:

an N–column×R–row logical representation of a set of data elements in an array of independent disks, N being equal to one less than a prime number P, and R being equal to half of one less than P, the data in the set organized into a plurality of stripes, each stripe comprising a plurality of strips, all strips of a column located on the same disk, one and only one parity value stored per column per a reconstruction set; and an array controller coupled to the disk array and configured to:

a. assign each strip containing data to at least two different parity groups so that each strip containing data in a respective column is assigned to parity groups different than other strips containing data in the column, wherein assigning each strip containing data to at least two different parity groups comprises assigning membership in a first parity group, $GA_{r,c}$ whose value is calculated according to the formula:

$$GA_{r,c} = (r \times c) \bmod P;$$

where r indicates the current row location of the strip containing data, c represents the current column location of the strip containing data, x represents the multiplication function, and P is equal to the number of disks in the array +1; and assigning membership in a second parity group $GB_{r,c}$, whose value is calculated according to the formula:

$$GB_{r,c} = [(N-1-r) \times c] \bmod P;$$

where r indicates the current row location of the strip containing data, c represents the current column location of the strip containing data; N represents the number of disks in the array, x represents the multiplication function; and P is equal to N+1;
  b. calculate, for each parity group, a parity value corresponding to all of the strips assigned to the parity group; and
  c. store each of the parity values in strips of different columns so that none of the strips containing data in a column are assigned to a parity group whose parity value is stored in that column.

10. The system of claim 9, the array controller further configured to recover data from failed disks by:
  a. locating a first data strip on one of the failed disks being assigned to a parity group having a parity value located on an intact disk so that none of the remaining members of at least one of the parity groups of which the data strip is a member are located on a failed disk;
  b. reconstructing the first data strip using the other members of the parity group and the parity for the group;
  c. locating a next data strip on one of the failed disks, the next data strip being a member of the other parity group of which the previously reconstructed data strip is a member;
  d. reconstructing the next data strip using the other members of the parity group and the parity for the group;
  e. alternately locating and reconstructing the remaining strips according to steps c–d until no further data strips can be recreated or a parity strip on a failed disk is reconstructed; and
  f. alternately locating and reconstructing the remaining strips according to steps a–e if un-recreated data strips remain after reconstructing the parity strip.

11. A method of providing multiple disk fault tolerance in an array of N independent disks, N being one less than a prime number, the array organized into a plurality of stripes, each stripe comprising a plurality of strips, the method comprising:

partitioning the array into a plurality of logically represented N–column by R–row reconstruction sets, R being equal to half of one less than a prime number P, so that the columns correspond to the disks in the array, all strips of a column are located on the same disk, and the rows extend across all the disks in the array;

assigning each strip containing data to at least two different parity groups, wherein assigning each strip containing data to at least two different parity groups comprises assigning membership in a first parity group, $GA_{r,c}$, whose value is calculated according to the formula:

$$GA_{r,c} = (r \times c) \bmod P;$$

where r indicates the current row location of the strip containing data, c represents the current column location of the strip containing data, x represents the multiplication function, and P is equal to the number of disks in the array +1; and assigning membership in a second parity group $GB_{r,c}$, whose value is calculated according to the formula:

$$GB_{r,c} = [(N-1-r) \times c] \bmod P;$$

where r indicates the current row location of the strip containing data, c represents the current column location of the strip containing data; N represents the number of disks in the array, x represents the multiplication function; and P is equal to N+1;

calculating a parity value for each parity group; and storing, for each reconstruction set, each of the parity values in strips of different columns, one and only one parity value per column, per reconstruction set, so that none of the strips containing data in a column are assigned to a parity group whose parity value is stored in that column.

* * * * *